United States Patent [19]

Csonka

[11] 4,253,190
[45] Feb. 24, 1981

[54] COMMUNICATIONS SYSTEM USING A MIRROR KEPT IN OUTER SPACE BY ELECTROMAGNETIC RADIATION PRESSURE

[75] Inventor: Paul L. Csonka, Eugene, Oreg.

[73] Assignee: The United States of America as represented by the United States Department of Energy, Washington, D.C.

[21] Appl. No.: 28,780

[22] Filed: Apr. 10, 1979

[51] Int. Cl.³ .................... H01Q 6/13; H04B 7/145; H04B 7/185
[52] U.S. Cl. ........................ 455/12; 343/100 CS; 343/757
[58] Field of Search ............ 343/100 ST, 100 AM, 343/100 AD, 700, 711, 712, 757, 705; 325/4, 112, 14; 455/12, 98

[56] References Cited

U.S. PATENT DOCUMENTS

| | | | |
|---|---|---|---|
| 3,150,363 | 9/1964 | Finvold | 343/5 SA |
| 3,151,325 | 9/1964 | Kompfner | 343/100 AM |
| 3,169,245 | 2/1965 | Cutler | 343/100 ST |

*Primary Examiner*—Benedict V. Safourek
*Attorney, Agent, or Firm*—James E. Denny; Dean E. Carlson; Richard E. Constant

[57] ABSTRACT

A method and system are described for transmitting electromagnetic radiation by using a communications mirror located between about 100 kilometers and about 200 kilometers above ground. The communications mirror is kept aloft above the atmosphere by the pressure of the electromagnetic radiation which it reflects, and which is beamed at the communications mirror by a suitably constructed transmitting antenna on the ground. The communications mirror will reflect communications, such as radio, radar, or television waves up to about 1,100 kilometers away when the communications mirror is located at a height of about 100 kilometers.

18 Claims, 6 Drawing Figures

COMMUNICATIONS SYSTEM USING A MIRROR KEPT IN OUTER SPACE BY ELECTROMAGNETIC RADIATION PRESSURE

This invention was made in the course of, or under, a contract with the Department of Energy.

BACKGROUND OF THE INVENTION

This invention relates to a communications system using an electromagnetic energy reflector or mirror kept in outer space by electromagnetic radiation pressure.

Good non-cable television reception generally requires line-of-sight transmission. To increase line-of-sight range, a television broadcasting station can increase the height of its transmission antenna. However, due to construction costs, weight, wind, and other factors, the height of a television antenna is limited. One method to increase the line-of-sight range of television reception is to locate relay stations to receive television signals by a long cable or line-of-sight transmission from a television broadcasting station and then to rebroadcast the signals to television sets in the vicinity of the relay station.

To extend the range of television reception the reflector mirror could be attached to an earth satellite. However, an earth satellite would, in general, move with respect to the surface of the earth and stay above the horizon only for a few minutes at a time (approximately less than 10 minutes when the height is approximately less than 600 kilometers). That, together with the expensive cost of satellite launching, makes this an unattractive possibility. Earth satellites, whether stationary or not, do not require energy transmitted from the earth to stay in orbit.

A stationary earth satellite equipped with a large reflector communications mirror would serve the desired purpose. Given sufficient power, it could beam programs to viewers located almost anywhere on about one-half of the earth's total surface. For such a satellite, the height is necessarily about 36,000 kilometers. If the wavelength equals 2 meters and the antenna's radius equals 1.2 kilometers, then the radius of the reflector communications mirror must be greater than approximately 36 kilometers. A mirror of this size would have to be assembled in orbit.

Expensive and sophisticated equipment is required to receive signals from existing communication satellites. Presently these reflected or retransmitted signals are eventually received by TV relay stations to be rebroadcast along line-of-sight to TV sets in the vicinity. Such satellites operate above the earth's ionosphere where ionospheric interference with signal transmission from and to the earth is found. Such satellites operate with decreased transmission efficiency because of the great distances involved. Thus even with satellites, most television viewers today are able to receive only programs beamed to them from a relay station located nearby. In those areas where there are no relay stations, or where existing stations do not transmit programs which some viewers wish to receive, good reception of desired programs is usually impossible. These difficulties could be avoided only if the need for local relay stations could be eliminated. There is also presently lacking an effective means for over-the-horizon radar and a means to impart a high electromagnetic radiation intensity to a wide area on the ground.

SUMMARY OF INVENTION

In view of the above, it is an object of this invention to provide line-of-sight electromagnetic wave transmission to areas lacking line-of-sight broadcasting or ground relay stations.

It is a further object of this invention to provide over-the-horizon electromagnetic wave transmission without the use of earth orbiting satellites or long cables.

It is a further object of this invention to provide for a transmission system to cover large areas of the earth with lower cost, lower power, and higher transmission efficiency than that of earth orbiting satellites.

It is a further object of this invention to provide television reception over large areas of the earth essentially without ionospheric interference with signal transmission.

It is a further object of this invention to provide for over-the-horizon radar and a means to impart a high electromagnetic radiation intensity to a wide area on the ground.

Various other objects and advantages will appear from the following description of an embodiment of the invention, and the most novel features will be particularly pointed out hereinafter in connection with the appended claims. It will be understood that various changes in the details, materials, and arrangements of the parts which are herein described and illustrated in order to explain the nature of this invention may be made by those skilled in the art without departing from the scope of the invention.

The invention comprises a method and system for transmitting electromagnetic radiation comprising disposing an antenna on the earth, transmitting electromagnetic radiation, having a diffraction peak and interference pattern, from said antenna generally vertically upward, disposing a dish shaped electromagnetic radiation reflector communications mirror, having a center of mass located below the point of attack of said transmitted electromagnetic radiation, at a height from about 100 kilometers to about 200 kilometers generally vertically above and oriented face down towards said antenna, supporting said mirror's weight by the electromagnetic radiation force transmitted by said antenna, controlling the height of said mirror by varying the intensity of said force, and reflecting said electromagnetic radiation or some other electromagnetic radiation with said mirror back toward the earth.

DESCRIPTION OF DRAWING

The present invention is illustrated in the accompanying drawing wherein.

DETAILED DESCRIPTION

Figure 1:
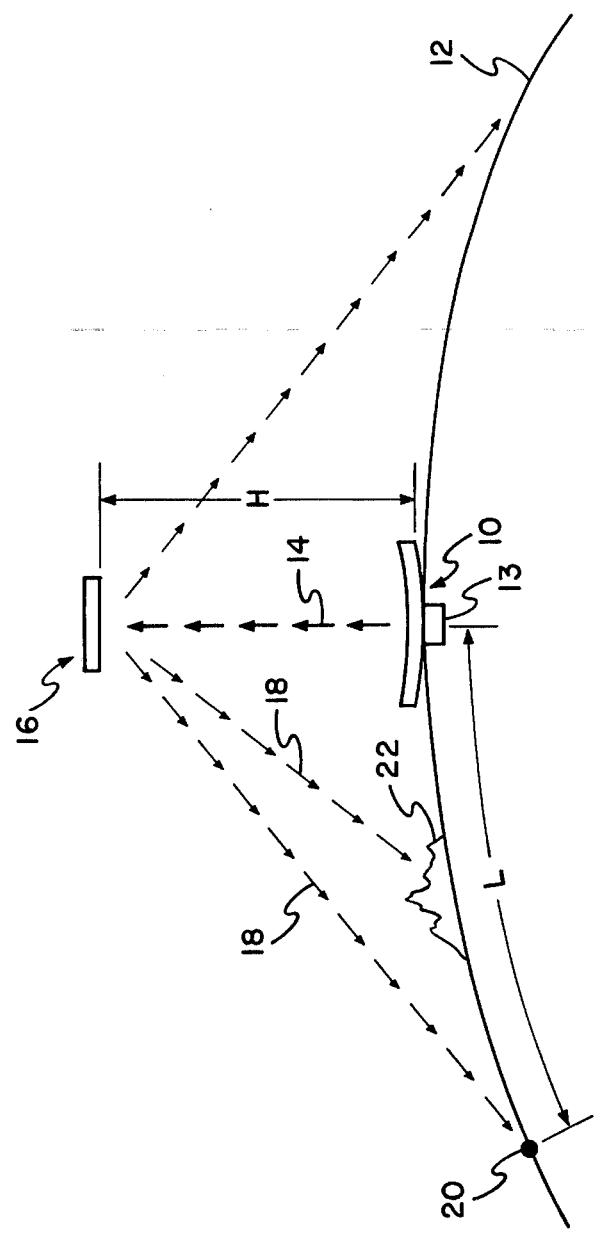
FIG. 1 is a diagrammatic view of a communications system showing the signal transmission path and apparatus of the communications system embodying this invention.

In the following "television wave" shall mean an electromagnetic wave in the television or microwave range. In FIG. 1 a television transmitting antenna or antenna array 10 is located on the earth 12. Television broadcasting equipment 13 transmits by the antenna 10 a television wave 14 vertically upward. Directly above the antenna 10 is a television wave reflector communications mirror or mirror system 16 at a height H above the earth's surface. The reflector mirror 16 reflects the transmitted wave 14 as a reflected wave 18 along a line of sight to the antenna of a home television set 20, which is located at a distance L from the transmitting antenna 10. The television set may be close to or over the horizon from the transmitting antenna. An obstacle 22 such as mountains may be between the television set and the transmitting antenna.

If the reflector mirror 16 is located at a height H of 100 kilometers above the earth 12 it will be in direct view of any viewer on the earth 12 within a distance L of about 1,100 kilometers as measured from the transmitting antenna 10. Therefore, it would beam programs directly to the viewers. If the transmitting antenna 10 radiated approximately 10 or more megawatts of power 14, then the reflected signal 18 would be strong enough to get behind most of the common obstacles, such as tall buildings, and thus ensure good reception almost anywhere within about 1,100 kilometers of the transmitting antenna 10. In general, a reflector communications mirror located at height H above the earth 12, would be above the horizon when viewed from within a circle of radius $L \approx (2HR_E)^{\frac{1}{2}}$, where $R_E$ is the radius of the earth, provided that $L << R_E$.

With a transmitting antenna 10 of radius $r_g$ located on the ground, and a reflector communications mirror 16 of radius $r_a$ located at a height H above the ground, at least 84 percent of the power radiated by the transmitting antenna 10 will reach the reflector communications mirror 16 (all the power radiated into the first Fresnel Zone) provided that $$r_a \gtrsim 0.6 \lambda h / r_g \qquad \text{(Equation 1)}$$

where $\lambda$ is the television carrier wavelength, and the reflector communications mirror is located at a height H above ground. For H=100 kilometers, $\lambda$=1 centimeter, and $r_g$=300 meters, a reflector communications mirror with a radius $r_a \gtrsim 2$ meters is needed, as derived from Equation 1.

The reflector communications mirror 16 may be made to reflect TV waves not to a relay station, but directly to those areas on the ground where the programs are to be viewed. A wide range of frequencies may be so reflected, no "tuning" of the reflector communications mirror 16 is necessary.

The reflector communications mirror 16 of radius $r_a$ may be maintained at a height H solely by the radiation pressure 14 exerted on it by the electromagnetic waves which it reflects. A satellite is not needed to carry it. The equipment 13 may include means to sense variations in height of the mirror 16 and to adjust the power of radiation transmitted to control the height of the mirror 16.

At normal incidence, 10 magawatts of radiation will exert a force of about 6.67 gram weight on a totally reflecting perfectly flat mirror. Real communication mirrors are neither perfectly reflecting, nor perfectly smooth. Nevertheless, for wavelengths of interest, deviations from the ideal case can be made relatively small, so that if the mirror weighs 6.67 grams, it will "float" on the radiation 14 impinging on it, whenever the radiation carries somewhat more than 10 megawatts of power.

When the mirror is located at or above 100 kilometers, it will be above most of the atmosphere. At this height the wind pressure on it is negligible. There are only two dominant forces acting on it: radiation pressure and gravitation. The mirror needs no rigid frame: the interplay of these two forces will "blow up" the mirror to its desired (for example, parabolic or shallow dish) shape, just as gravitation and wind pressure are known to blow up a parachute.

The communications mirror will be made light enough to float on the radiation it reflects. The mirror may consist of a set of parallel wires with a diameter 2r, located at a distance d from each other. When the wires are parallel to the electric field in the impinging wave, the transmissivity of such a mirror is $$T \approx 4(d/\lambda)^2 \{ \ln | [0.83 \exp(2\pi r/d)][\exp(2\pi r/d)-1]-1|\}^2 \qquad \text{(Equation 2)}$$

A similar formula is given in N. Marcuvitz, *Waveguide Handbook* (Maple Press Co., York, Pa., 1951).

For $\lambda$=2 meters, d=5 centimeters, 2r=$10^{-3}$ centimeters, Equation 2 gives a transmissivity T of 12.9%.

The wires will absorb some of the radiation falling on them. This energy will heat the wires. However, the heating will not melt the wires. A good conductor will absorb a fraction A of the energy impinging on its surface, where $$A = c(\pi \sigma \delta)^{-1} 2 d^2 / \pi^2 4 r^2 \qquad \text{(Equation 3)}$$

Here $\sigma$ is the conductivity of the conductor, c is the speed of light, and for wavelength $\lambda$, the skin depth is $\delta \approx (2\pi)^{-1}(c\lambda/\mu\sigma)^{\frac{1}{2}}$ where $\mu$ is the magnetic permeability. When $d/\lambda << 1$ then the mirror can be thought of as an approximately smooth surface in which a spatially uniform surface current is oscillating. The oscillations must cancel $(1-T)$ fraction of the field energy behind the mirror. In reality, of course, the current is confined to the wires. However, if $d/\lambda$ is small enough, the approximation will be a good one. In this approximation, the energy absorbed by the mirror is A times the energy reflected from the mirror.

Figure 2:
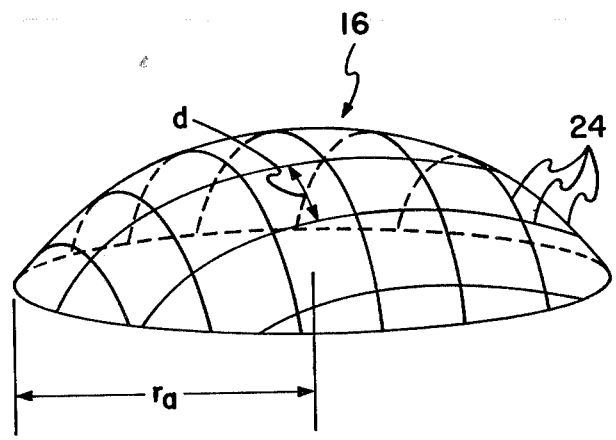
FIG. 2 is a diagrammatic and perspective view of the reflector communications mirror.

A mirror made of a set of parallel wires would work. Nevertheless, it is often better to have a mirror made of two perpendicular sets of parallel wires in a checkerboard array, every wire in the first set being perpendicular to every wire in the second set, and all wires lying in the surface of the mirror 16 as shown in FIG. 2. Each set contains the same number of wires and the spacing d between wires 24 in both sets is the same. In other words, we have a mirror 16 made of a wire mesh (like a screen) instead of a set of parallel wires. Such a mirror can better withstand mechanical stresses, and a rotation of the mirror (with respect to the incoming electric field 14) can be ignored, as long as the surface of the mirror is left unchanged. As an example of such a mirror, consider a circular plane wire mesh with a mirror radius $r_a$ as in FIG. 2. The total length of the wires needed to make the mesh, when $d << r_a$, is $S \approx \pi r_a^2 (d^{-2}) 2d$, so that total weight of mirror is $$F_g = \pi r^2 (2\pi r_a^2 d^{-1}) \rho \qquad \text{(Equation 4)}$$

where $\beta$ is the specific weight of the wire material. When ($\lambda=1$ centimeter) $d=7.66\times 10^{-2}$ centimeters, $2r=10^{-4}$ centimeters, $r_a=2$ meters, and the wire material is aluminum, then $\rho=2.70$ gram/cubic centimeter, $S\approx 3.2\times 10^6$ centimeters, and $F_g=6.95\times 10^{-2}$ grams. Thus the entire mirror can be supported by the pressure of 100 kilowatts radiation reflected from the mirror.

The total surface of all the wires in the mesh is B. If the mesh has temperature t, and is placed in outer space, then the power radiated by it is given by the Stefan-Boltzmann law:

$$W_t=(\epsilon)5.67\times 10^{-12} \text{ (Watts deg}^{-4}\text{ cm}^{-2})t^4(B) \quad \text{(Equation 5)}$$

Where $\epsilon$ is the emissivity of the wires surface. For copper, $\epsilon\approx 0.15$ (somewhat higher for oxidized surface). If necessary, one can always increase the density of wires in the mirror (i.e., decreased). This will increase the weight of a unit mirror surface. Alternatively, one can reduce the wire radius, and if $2r\lesssim\delta$, use a multiple mirror system consisting of several mirrors located one above the other (see below). Yet another possibility is to use ribbon shaped wires rather than wires with circular cross section. If the thickness of the ribbons $\lesssim\delta$, one can lay a circular wire with $2r\gtrsim\delta$ on each ribbon to increase the mirror reflectivity.

The tensile strength of an aluminum wire is about $1.1\times 10^6$ grams/square centimeter. Thus an aluminum wire with $2r=10^{-4}$ cm can carry $8.64\times 10^{-3}$ gram weight, or 12% of the total mirror weight. Since there are now over ten thousand wires in this mesh, there will be no overstressing of the wires. Even if one-half of the mirror were to be pulled in one direction by some unforeseen force ten times as large as the weight of this half-mirror, and the other half pulled in the opposite direction by a force of equal magnitude the wires would on the average still carry less than 0.15% of the tensile strength. Since, furthermore, the wires are elastic, averaging is expected.

Meteors are not likely to be a major problem. The total area presented to a meteor by the mirror is $S\times 2r$. For the parameter values chosen above, that means only $\approx 3.2\times 10^{-2}$ square meters. Should a meteor nevertheless strike a wire, the wire will break at the point of impact, unless the force along the wire is less than $8.64\times 10^{-3}$ gram weight. Only a small component of which will be perpendicular to the mirror surface. On the other hand, even a force of $8.64\times 10^{-3}$ gram weight is much less than the weight of the mirror, and can be counterbalanced by a small fractional temporary increase in the power radiated from the ground.

When the parameters are chosen as above ($H=10^5$ meters, $\lambda=1$ centimeter, $r_a=2$ meters) then Eq (1) would require that $r_g\gtrsim 300$ meters. The value of $r_g$ can be kept small in the following way.

Figure 3:
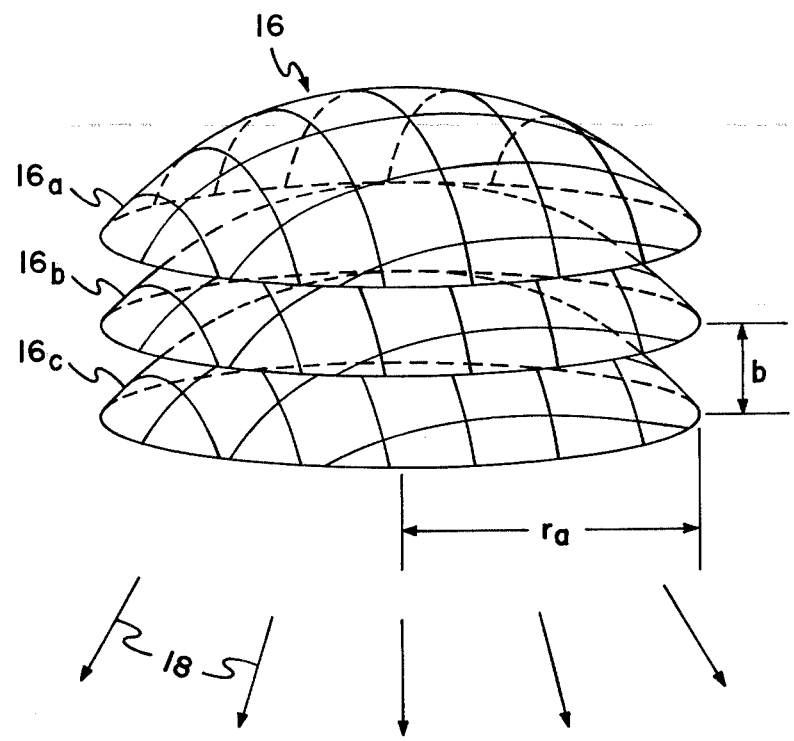
FIG. 3 is a diagrammatic and perspective view of a multiple mirror system.

Instead of placing a single mirror to a height H above ground, several parallel mirrors are placed there, one behind the other at a distance b from each other. This is shown in FIG. 3 for three mirrors: $16_a$, $16_b$ and $16_c$. This is particularly useful, if a large B value is desired, or when the wire diameter 2r is less than the skin depth $\delta$ for the radiation impinging on the mirror. As an illustration, suppose that $\delta/r=n$ which is $>1$. When $n>>1$, then a single mirror of the above type will transmit most of the radiation impinging on it, even if according to Equation 2, the transmissivity of the mirror would be small. The reason is that in equations like Equation 2, the wires are assumed to be perfect conductors, i.e., one approximates the correct result by putting $\delta=0$. This approximation is a good one only as long as $\delta<<2r$. When $\delta\gtrsim 2r$, the radiation leaking through the wires becomes significant, and the transmission increases. To reduce this transmission, one may increase r. If that is done, the weight of the mirror will increase proportionally to $r^2$. By contrast—and this is what is suggested here—one may leave the wire radii unchanged, but place several mirrors of similar construction one above the other. Now each individual mirror will still have a large transmissivity, but when the number of mirrors, n, is such that $n\gtrsim\delta/2r$, then the transmissivity of the mirror system as a whole can be made small. The total weight of the whole mirror system is roughly proportional to n (exactly so if all mirrors are identical). This is to be compared with the previously mentioned case where the total weight was proportional to $r^2$ which in turn is proportional to $n^2$.

In practice the mirrors should be made similar, but not identical to each other: since less radiation reaches the higher lying mirrors, their reflection efficiency per unit weight has to be made higher than for the lower lying mirrors of the mirror system.

The wires may be deposited on thin threads of some light high-strength material such as a polyester resin material; for example a polyester of ethylene, glycol and terephthalic acid. Such materials may exhibit a specific weight considerably less than that of copper.

The ground antenna may be a sequence of parallel conductors, appropriately phased, to imitate a paraboloid. If the distance between adjacent wires is $\lambda$, then although the near field of the antenna will differ from that of a smooth paraboloid, the far field will not.

The mirror may be shaped so as to be stable with respect to horizontal drifting and tilting. If the mirror has the shape of a dish, facing down, then it will be stable with respect to horizontal displacements away from the center of the diffraction peak created by the transmitting antenna on the ground. The mirror could be circular, generally elliptical, or any other suitable configuration. If the mirror is displaced, e.g. to the left, the force exerted on its right side by the radiation will exceed that exerted on its left side. This force will have a horizontal component, pushing the dish back to the center. Possible oscillations will be damped by the rare atmosphere around the mirror. Should higher damping be desired, the mirror may be lowered temporarily, by decreasing antenna power, to denser atmosphere at times when the wind there is moderate. Slowly displacing the axis of the interference pattern created by the ground antenna, will, by the same argument, induce a corresponding displacement of the floating mirror. Thus, its lateral as well as vertical position could be controlled from the ground. Stability against tilting can be insured by arranging the center of mass of the mirror to lie below the point of attack of the resultant lift force. This may be achieved by making the perimeter of the dish heavier than its center, or, better yet, by hanging a small weight from its periphery in a manner of a weight hanging from a parchute. In either case, the radiation will "blow up" the mirror to its desired shape, and will keep it facing down. The radii of curvature of the dish will determine the shape of the area in which it will radiate. There is no need to make all radii equal: the perimeter of the dish may be e.g. an ellipsoid. Usually, smaller radius of curvature will mean larger area illuminated.

The mirror shape and effective radius can be varied by rotating the mirror around its axis at various angular velocities. The angular velocity can be governed from the ground by rotating the plane of polarization of the radiation impinging on the mirror. For example, flaps could be hung from the edge or perimeter of the mirror which would gradually open up as the angular velocity increases.

While reference is made to the antenna 10 being located "on the earth," one can readily appreciate that it could be supported by a tower, airplane, ship, or the like.

The electromagnetic radiation transmitted by the antenna 10 could include microwaves, radar, television, short wave radio, medium wave radio, and long wave radio transmissions, as well as radiation of shorter wavelength such as visible light. The wavelength of the electromagnetic radiation signal that is being transmitted by mirror 16 will be effected by the spacing between the wires of mirror 16 and possibly their diameters.

The reflector mirror would be disposed at a height below about 36,000 kilometers which is the height of a stationary earth orbiting satelite. Below about 36,000 kilometers radiation force is needed to support the reflector mirror. The preferred height is about 200 kilometers for size and power considerations.

Figure 4:
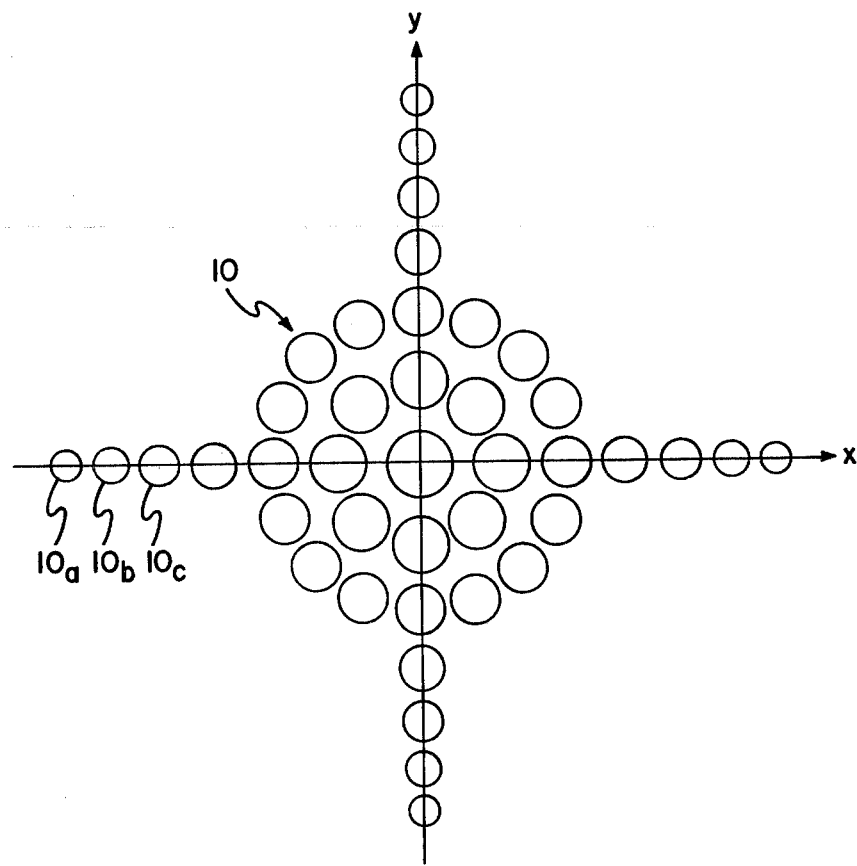
FIG. 4 is a diagrammatic view of a ground antenna arrangement or array composed of constituent antennas.

The antenna 10 may be a circular dish ground antenna. However, in many cases it is desirable to use not a circular dish ground antenna, but rather an array of smaller "constituent" dish antennas (items $10_a$, $10_b$, $10_c$ etc., as shown in FIG. 4) placed next to each other along two straight axes on the ground arranged in a cross shape. Additional constituent antennas may be placed between the lines as shown in FIG. 4. The constituent antennas need not all be circular nor of the same size. Furthermore, for many applications it is desirable to have the radiation intensity emitted by the smaller constituent antennas vary for example as a Gaussian, as a function of the location of the constituent antennas; in an xy cartesian coordinate system, the center position of any constituent antenna would be denoted as (x,y). The intensity of that constituent antenna is then given by the product of two gaussians, one as a function of x with width $\sigma_x$ the other as a function of y with width $\sigma_y$ ($\sigma_x$ may be choosen to be equal to $\sigma_y$).

Figure 5:
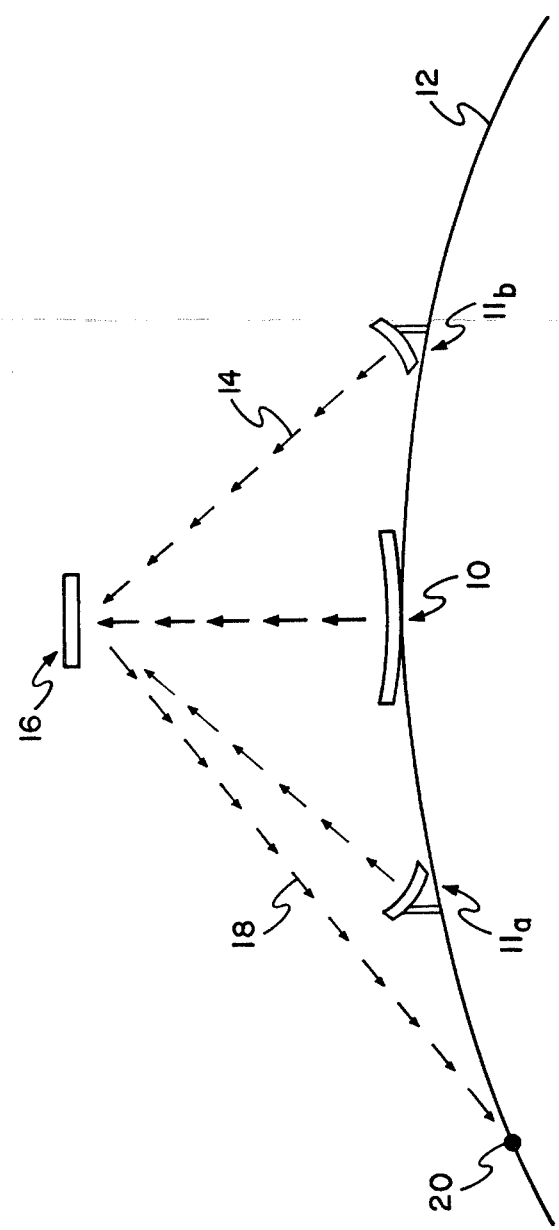
FIG. 5 is a diagrammatic view of a multiple antenna system for communication between different parts of the earth.

In some cases it may be desirable to have a ground antenna system consisting of several antennas (with each antenna consisting of one or more constituent antennas) located at large distances (comparable to H) from each other. FIG. 5 shows a three antenna 10, $11_a$, and $11_b$ system. Such arrangement will allow greater flexibility in choosing the final position of the mirror by varying the intensity of the electromagnetic radiation radiated by each antenna.

In FIG. 5, each antenna 10, $11_a$, and $11_b$ does not have to transmit electromagnetic radiation of the same wavelength. Thus several television channels of information may be transmitted. A reflector communications mirror 16 may be designed such that certain parts or segments of the mirror would reflect electromagnetic radiation of certain wavelengths better than other wavelengths. For example, a mirror may be constructed with three corners such that each corner would reflect microwaves best and the center of the mirror would reflect longer wavelengths best. Also, referring to FIG. 4, each constituent antenna such as $10_a$ may transmit at several different frequencies. Referring to FIG. 5, the intensity of the transmitted radiation from each of the three antennas 10, $11_a$, and $11_b$ may be chosen such that the three antennas act not only to transmit electromagnetic radiation to a desired point 20 but also to support the mirror 16. As an option, the intensity of the electromagnetic radiation of the antenna 10 directly underneath the mirror 16, in FIG. 5, may be chosen to be much greater than the intensity of the other two antennas, $11_a$ and $11_b$. Thus the electromagnetic radiation from the antenna directly underneath the mirror would be used mainly to support the mirror while the desired information signals would come from the other antennas, to be reflected by the mirror 16 to the desired point 20.

Figure 6:
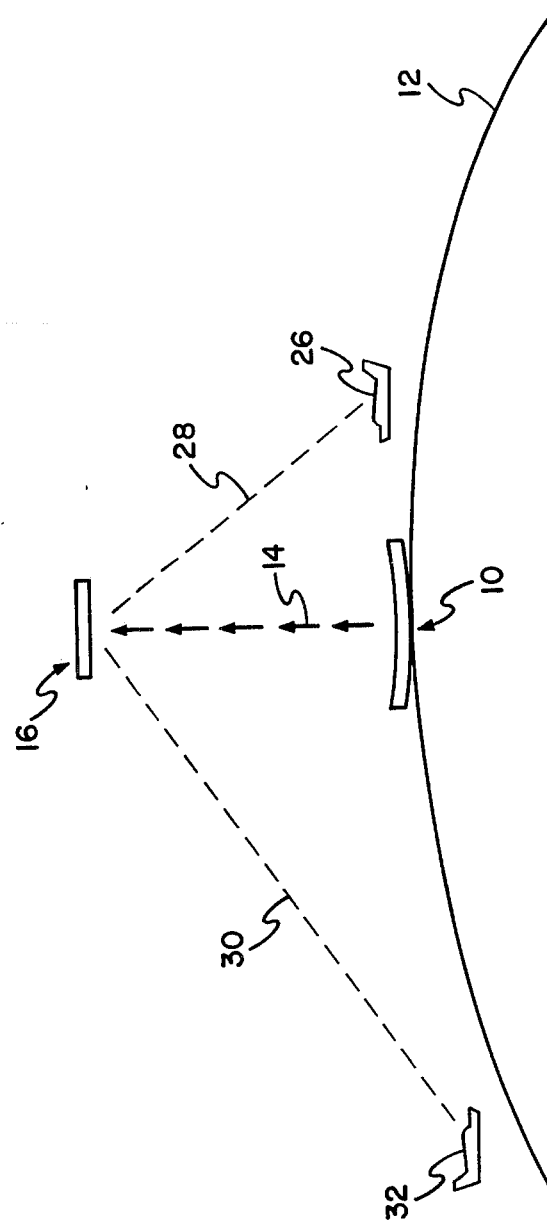
FIG. 6 is a diagrammatic view of an over-the-horizon radar system.

An over the horizon radar system is depicted in FIG. 6. In this system the reflector mirror 16 is supported solely by antenna 10. The electromagnetic radiation 14 from the antenna 10 is much larger than any other radiation impinging on the mirror 16. An airplane 26 emits a radar signal along path 28 which is reflected by mirror 16, and the reflected signal along path 30 strikes a target 32. The radar wave is reflected by the target 32 along path 30 to again strike mirror 16 to be finally reflected back along path 28 to a receiving station located on the airplane 26. Of course it is to be understood that the radar signal could be emitted and received from a point near antenna 10.

The reflector mirror may be kept afloat by radiation pressure at altitudes lower than where satilites are generally located. In particular, it may be kept below most of the ionosphere, so that the ionosphere's interference with signal transmission may be essentially eliminated. Close proximity to the earth allows higher transmission efficiency from the earth to the mirror and back.

If the ground antenna emits high enough radiation and if the communications mirror is large enough, radiation intensity reflected from the mirror may reach dangerous levels on the ground. If that is not desired, the danger may be eliminated by restricting the mirror's radius. Thus the mirror may be made perfectly safe. Actually, the radiation from a properly designed mirror will be environmentally even safer than the radiation emited by the large number of relay stations now in use. The near fields of the existing relay stations may be dangerous, whereas the near field of the communications mirror is located far from all human habitat and is thus harmless. On the other hand, the far field of the mirror may be designed to assume essentially the most desired value on the ground.

For launching the mirror, it may be placed on a frame or in a container while being lifted by a balloon or series of balloons through the lowest layers of the atmosphere. This will provide protection from the forces due to wind. As the balloon rises, air density decreases and, consequently, so does the force exerted by the wind on the mirror (or its container). At some height (part of) the frame or container can be released and the remaining lighter load raised further. The frame or container may be released in several stages. Eventually, the mirror is released and final positioning is done by varying the radiation pressure from the ground.

What we claim is:

1. A method for transmitting electromagnetic radiation signals comprising transmitting electromagnetic radiation, having a diffraction peak and interference pattern, from an antenna located on the earth generally vertically upward; disposing a dish shaped electromagnetic radiation reflector communications mirror, having a center of mass located below the point of attack of said transmitted electromagnetic radiation, at a height of from about 100 kilometers to about 200 kilometers generally vertically above and oriented face down towards said antenna so as to receive said transmitted electromagnetic radiation; supporting said mirror by the force produced by said electromagnetic radiation transmitted by said antenna; controlling the height of said mirror by varying the intensity of said force; and reflecting electromagnetic radiation signals with said mirror back toward the earth.

2. The method of claim 1 wherein said electromagnetic radiation signals have a wavelength from about that of microwaves to that of radio waves.

3. The method of claim 1 wherein said mirror reflects said electromagnetic radiation signals back towards the earth over the horizon from said antenna.

4. The method of claim 1 further including disposing an array of said antennas on earth configured so that the resultant total electromagnetic radiation is transmitted generally vertically upward, and disposing said mirror generally vertically above said resultant total electromagnetic radiation.

5. The method of claim 4 wherein one or more antennas are transmitting at different wavelengths.

6. The method of claim 1 further including disposing a plurality of said mirrors vertically positioned at different heights.

7. The method of claim 1 further including adjusting the lateral position of said mirror by displacing the axis of the interference pattern created by said antenna's electromagnetic radiation.

8. The method of claim 1 wherein said electromagnetic radiation includes plane-polarization and further including disposing a plurality of flaps on the edge of said mirror and rotating the plane of polarization of said radiation to rotate said mirror to open up said flaps to change the shape and effective radius of said mirror.

9. A system for transmitting electromagnetic radiation signals comprising an antenna means disposed on the earth for generally vertically transmitting electromagnetic radiation having a diffraction peak and interference pattern; means for generating electromagnetic radiation and transmitting the same through said antenna; means for varying the intensity of said electromagnetic radiation; and a dish shaped electromagnetic radiation reflector communications mirror, having a center of mass located below the point of attack of said transmitted electromagnetic radiation, at a height, of from about 100 kilometers to about 200 kilometers generally vertically above and oriented face down towards said antenna, at which said mirror's weight is supported by the transmitted electromagnetic radiation force from said antenna, to effect reflection of said electromagnetic radiation signals with said mirror back towards the earth.

10. The system of claim 9 wherein said electromagnetic radiation signals have a wavelength from about that of microwaves to that of radio waves.

11. The system of claim 9 wherein said mirror comprises two generally perpendicular sets of generally equally spaced parallel wires having a checkerboard array.

12. The system of claim 12 wherein the wires of said mirror are of generally circular cross section having diameters substantially smaller than the spacing between said generally parallel wires.

13. The system of claim 9 wherein said antenna means includes an array of antennas wherein said array is positioned to provide generally vertically upward resultant electromagnetic radiation, wherein said mirror is generally vertically above said electromagnetic radiation.

14. The system of claim 13 wherein said antennas of said array transmit said electromagnetic radiation at different radiation wavelengths.

15. The system of claim 13 wherein said mirror compromises a plurality of mirrors wherein said mirrors are disposed at different lateral positions generally vertically above said array of antennas.

16. The system of claim 9 further including a plurality of said mirrors with all mirrors positioned at a different height generally vertically above said antenna means.

17. The system of claim 9 further including a separate radar apparatus, having substantially less power than said antenna means, to effect the detection of an over-the-horizon target with said mirror.

18. The system of claim 9 wherein said electromagnetic radiation includes plane-polarization and further including a plurality of flaps depending from said mirror and means for rotating the plane of polarization of said radiation to effect the rotation of said mirror to effect the opening up of said flaps to effect the change of the shape and effective radius of said mirror.

* * * * *